Jan. 12, 1960 F. B. ODASZ, JR 2,921,313
PROCESS FOR THE MANUFACTURE OF RUBBERIZED BITUMEN
Filed Sept. 21, 1955
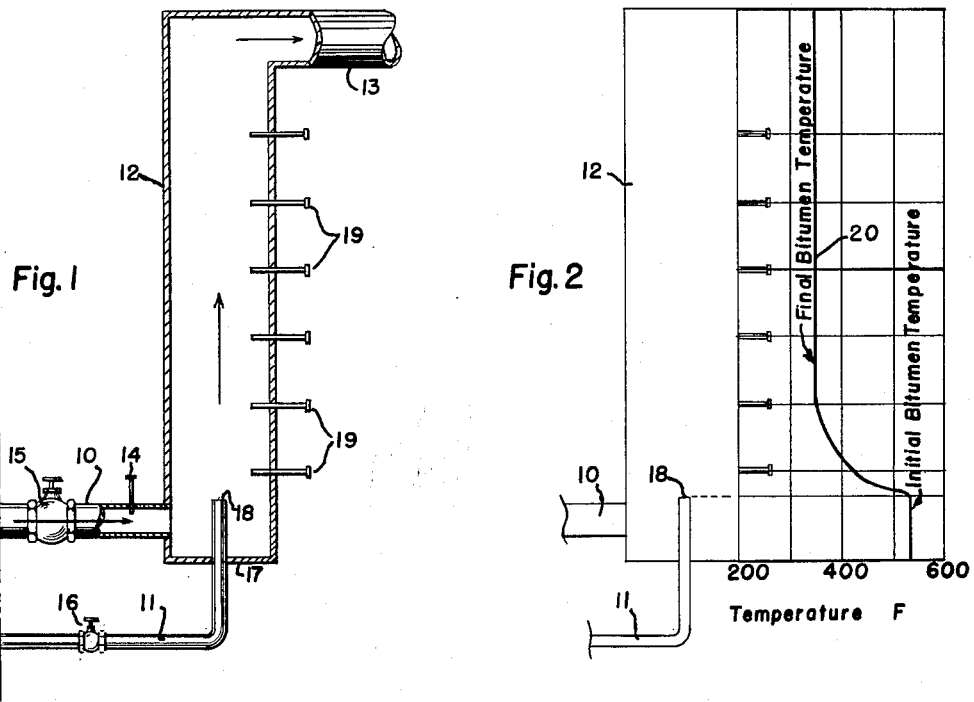
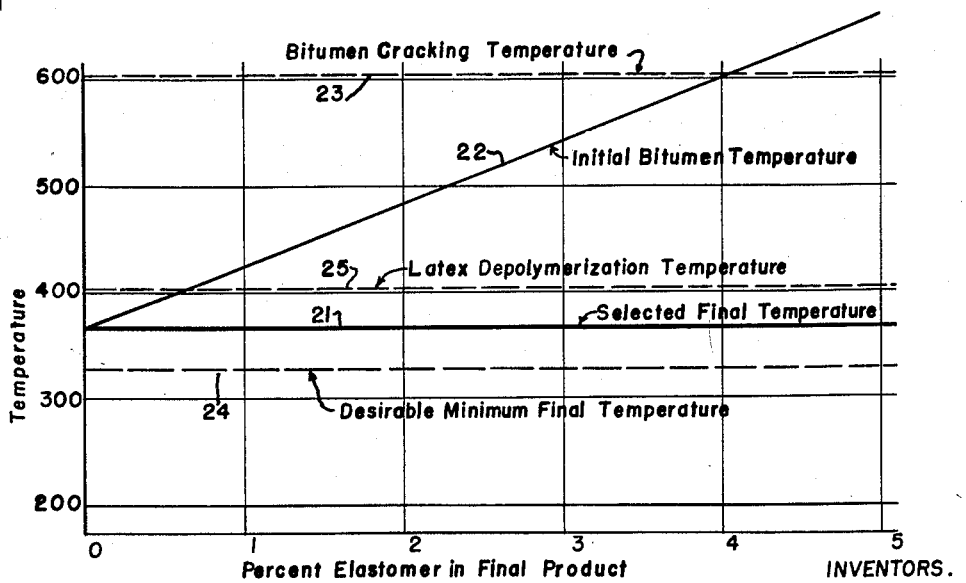
Fig. 3
INVENTORS.
Francis B. Odasz, Jr.
BY Whitehead, Vogl & Lowe
Per Frank C. Lowe
Attorneys

United States Patent Office 2,921,313
Patented Jan. 12, 1960

2,921,313

PROCESS FOR THE MANUFACTURE OF RUBBERIZED BITUMEN

Francis B. Odasz, Jr., Cody, Wyo.; Robert V. Witter, an original applicant, and said Odasz, assignors by mesne assignments, to Jewell R. Benson, Denver, Colo.

Application September 21, 1955, Serial No. 535,600

7 Claims. (Cl. 260—28.5)

This invention relates to processes for the manufacture of so called rubberized asphalts formed by combining such materials as asphalts, with elastomers such as natural of synthetic rubber and like monomers and polymers hereinafter referred to in this specification and in the claims as "rubber," the products of such mixtures being hereinafter referred to as rubberized asphalts. More particularly, the invention relates to processes for the manufacture of rubberized asphalt by the interblending of a latex or like water emulsion or dispersion of the rubber into the asphalt and the invention is a development from and improvement over the invention described and claimed in the copending application for Method for Rubberizing Bitumens, filed by Jewell R. Benson, on September 22, 1954, and bearing Serial Number 457,680, now abandoned.

In almost every instance in the manufacture of rubberized asphalts, wherein a relatively small amount of rubber is interblended into asphalt, the resulting product has physical properties superior to those of the asphalt per se, and there is a steady and increasing demand for rubberized asphalt. Accordingly, there is a need for improved methods for the manufacture of rubberized asphalt and it becomes a primary object of the present invention to provide a novel and improved method for the manufacture of rubberized asphalt, in a quick, efficient, and cheap manner.

The mechanics involved in such interblending of rubber and asphalt are not fully understood but it appears that a hot fluid asphalt will absorb or even dissolve a certain amount of the rubber, but where the amount of rubber has exceeded two or three percent rubber, there has been an increasing amount of discrete globules and threads of rubber in the asphalt. Regardless of the type of dispersion the product is improved over the bitumen per se and rubberized asphalts exceeding fifteen percent rubber are useful although it is desirable to have a minimum of discrete particles because of swelling and aging effects noted in the final product as the particles absorb oils from the asphalt.

There are some distinct disadvantages in conventional and known methods for preparing rubberized asphalt because such methods tend to cause excessive formation of discrete rubber particles and because of their expense and limitations where large amounts of the product are desired. One conventional method is to mix the rubber as powder, crumbs, or the like into the asphalt, a so called dry method. The disadvantages of this method include the fact that the rubber particles are coagulated, partially oxidized, vulcanized or otherwise altered so that they cannot be effectively absorbed in the asphalt. Also, there is the ever present danger that the rubber might become overheated and be depolymerized or otherwise decomposed, should the asphalt be heated to a point above the depolymerization temperature.

The present invention involves, and is an improvement over a second conventional method which involves the use of an emulsion, solution or dispersion of the rubber in water, such as the latices in which synthetic rubbers are dispersed in their final stage of polymerization, and such will be hereinafter referred to as a latex. The conventional methods of mixing a latex into asphalt are by adding the latex to the asphalt in a manner which slowly vaporizes the water and works the rubber from the latex into the asphalt by mechanical agitators. The disadvantages of this method are centered around the tendency of the rubber to coagulate as the latex is thickened as well as the problems involved in the mixing operation.

The very nature of such conventional mixing methods requires the use of a batch procedure, and premixed concentrated batches are often used in connection with larger batches. However, such is not too desirable because of the equipment needed and the fact that such mixing becomes difficult as the viscosity of the asphalt is increased by the rubber.

It follows that with such and other factors in view, the present invention was conceived and developed in connection with, and is an outgrowth and improvement of the aforesaid invention of Jewell R. Benson, and comprises in essence, a process for introducing a latex into a moving mass of hot liquid asphalt of sufficient heat to substantially flash the latex water into steam, all to accomplish the further objects of the invention which are to provide: (a) a quick, sudden transfer of the rubber from the latex to the asphalt; (b) a transfer of the rubber from the latex to the asphalt in a highly dispersed state and with an intense turbulent and mixing action; (c) a transfer of the rubber from the latex to the asphalt as a continuous flowing operation with only a single pass of the asphalt through the mixing apparatus; (d) a transfer of the rubber from the latex to the asphalt with the asphalt at very high temperatures sufficient to avoid foaming caused by steam from the latex water but without the danger of depolymerization of the rubber; (e) a transfer operation which used the ingredients in their simplest, most economical, and most easily handled forms; (f) a transfer operation which is performed in a simple, inexpensive manner with simple, easily obtained equipment; and (g) a transfer operation which may be easily adapted to obtain a final product of carefully controlled characteristics, with selected initial temperatures of the asphalt and selected adjustment of the water-solid ratio of the latex.

With the foregoing and other objects in view, all of which more fully hereinafter appear, my invention comprises certain novel and improved operations, steps and sequences and combinations of operations and steps, as hereinafter described and as defined in the appended claims, and illustrated in the accompanying drawing, in which:

Figure 1 is a sectional elevation view, diagrammatic in nature, of apparatus for the practice of the invention;

Figure 2 is a diagrammatic elevation view of the apparatus of Fig. 1 combined with a chart to illustrate the variation of temperature through the apparatus during the blending operations;

Figure 3 is a chart illustrative of the limits of initial and final temperature for various percentages of rubber interblended into asphalt.

In the basic concepts, the invention provides means and steps of operations whereby a rubber-carrying latex of a selected type is introduced into a body of hot liquid asphalt in such a manner as to provide for a sudden vaporization of the water content of the latex into steam, the vaporization occurring so quickly that the water seems to flash into steam. This action must necessarily occur at a substantial depth below a free surface of the liquid asphalt. The agitation and turbulence resulting from the sudden formation of the steam is thereby controlled to provide a mixing and interblending action to disperse the rubber into the asphalt by confining the movement of the asphalt as hereinafter described.

It is a further concept of the invention to so introduce the rubber-carrying latex as a continuous flow into a moving body of asphalt in a manner which provides for a continuous process of preparing rubberized asphalt and reference is made to Fig. 1 which illustrates diagrammatically a preferred form of apparatus for the practice of the invention. The asphalt and the latex are stored in tanks, not shown, and thence piped through asphalt supply line 10 and a latex supply line 11 respectively, to a vertically disposed blender pipe 12. The asphalt and latex supply lines 10 and 11 are connected to the bottom of the blender pipe 12 and the flow therethrough is upwardly to the top of the blender and thence through a discharge pipe 13 to a dehydrating or storage tank, not shown, which is of sufficient size to permit settlement of the final product and dispersion of foam or froth caused by steam.

The asphalt is heated at its source and flows in a heated state through the line 10 at a selected initial temperature which may be indicated by a thermometer 14. In operation of the apparatus, the flow of asphalt through this line 10 is controlled as by a valve 15 while the temperature is controlled by means not herein shown, such being well known to the art. The latex is kept at a normal temperature of approximately 65 degrees F. and its flow through the line 11 is controlled as by a valve 16, all to maintain in the final product a selected percentage of rubber. To most effectively attain such selected percentage, it may be desirable to also prepare the latex preliminary to the interblending operation by adding or removing water from the latex to obtain a selected proportion of solids to water in the latex as hereinafter described.

In the disclosed construction, the asphalt supply line 10 enters the bottom of the blender pipe 12 from the side thereof while the latex supply line 11 extends upwardly through the blender pipe bottom 17 into the blender with its exit 18 at a point preferably above the asphalt supply line; however other satisfactory arrangements are possible.

The blender pipe 12 may be of any suitable height to permit an efficient blending operation and of such diameter as to allow the fluid and steam formed by vaporization of the water to move therethrough and the steam to move upwardly through the asphalt as rising bubbles. In the course of such movement agitation of the asphalt will occur within the lateral confines of the blender pipe. As the latex is introduced into the flowing asphalt, a heat transfer occurs with the temperature of the asphalt being reduced by the sudden vaporization of the latex water and the nature of this heat exchange may be observed by a plurality of thermometers 19 spaced along the vertical blender pipe 12. A skilled technician can easily design and build a blender pipe of suitable diameter and length to permit such operations.

The rapidity at which the heat transfer occurs, indicating that the water vaporizes so quickly that it practically flashes into steam, is illustrated at Fig. 2 which is a descriptive chart wherein the ordinate is the indicated position of the thermometers 19 in the blending tower 12 and the abscissa represents the temperature within the tower. The curve 20 which is typical of laboratory tests indicates that the heat transfer is substantially complete within the first few diameters of the blending pipe 12 beyond the nozzle exit 18 where the introduction of the latex into the bitumen takes place.

Conventional methods of introducing latex into asphalt by relatively slow stirring are undesirable in that the vaporization tends to concentrate the rubber before the transfer of the rubber from the water to the asphalt takes place. However, in the present process where the sudden flashing of the latex water into steam occurs, the tendency towards concentration of the rubber is avoided and the particles of rubber are dispersed as the water practically explodes into steam but being unable to follow the water into the vapor phase, the particles quickly and effectively enter into the asphalt. This, in conjunction with the steam bubbles being formed in a confined pipe and being forced to flow upwardly through the pipe and move with and through the asphalt, provides an automatic mixing and interblending which is far more effective than mechanical agitation means, and contrary to conventional concepts of mixing latex into asphalt wherein the temperatures are maintained as low as possible to slow the processes and avoid splattering and explosions of the steam, the present concept is favorable of maintaining the temperatures as high as possible since the explosive action of water suddenly changing into steam is controlled by the confines of the blending pipe 12. Moreover, it has been discovered that where the initial temperature is maintained as high as possible, the final product is an improved product, as hereinafter pointed out through examples of actual tests.

The reactions which occur in this improved process involve a heat exchange which can be established by a skilled engineer by experiment or by calculations. Fig. 3 is a descriptive chart to demonstrate the limitations and basic reactions for the preparation of a rubberized asphalt using a conventional vacuum type asphalt having a cracking temperature at about 600 degrees F. and a latex which is a butadiene-styrene copolymer having 26.8 percent rubber solids, and being identified to the trade as "Fomex." The ordinate of this chart is temperature and the abscissa is percent rubber in the asphalt in the final product. The curve 21 represents selected desirable final temperature of the final product and the curve 22 represents the required initial temperature of the asphalt with various percentages of rubber and with this latex at an initial temperature of approximately 60 degrees F.

These relationships may be varied in any manner desired by changing the water content of the latex as by adding water, and in certain types of latex which are shipped with a high percentage of solids to reduce shipping costs, it is desirable and even necessary to dilute them.

There are certain recognized limitations for this process. It is generally undesirable that the initial temperature of the asphalt exceed the cracking temperature. Although this is not a definite limiting factor since cracked asphalts can also be rubberized this maximum permissible temperature will vary for different asphalt, conventional practice being considered as 600 degrees F. for the selected vacuum type asphalt, as indicated by the dashed curve 23. With some types of asphalts this cracking temperature may even exceed 900 degrees F.

As a second limitation, the initial temperature of the asphalt must be materially in excess of that required to convert the latex water into steam and great enough to provide heat sufficient to vaporize the latex water with the temperature of the final product being at least above 212 degrees F. We have discovered that a more practical final and desirable temperature of the rubberized asphalt is such as to render the product sufficiently fluid to handle easily and above a critical foaming limit temperature, where the steam breaks through the surface of the rubberized asphalt discharged from the blender pipe 12 will not cause excessive and sustained foaming. In the tests illustrated herein it was ascertained that the temperature should be greater than 325 degrees F. to avoid such excessive foaming, the dashed curve 24.

There is yet another limit and that is the temperature at which the rubber commences to depolymerize and although this limit is modified by time factors, it can be established and in the case of Fomex, it is undesirable to heat the final product above 400 degrees F., the dashed curve 25 indicating this limit.

It follows that if the curve 21, representing the temperature of the final product, is selected as being 367 degrees F., as a reasonable average between the limits established by factors, the foaming and depolymerization, the curves 24 and 25, that the curve representing the initial temperature of the asphalt will indicate a temperature increase in substantially linear proportion to the increase of rubber introduced into the asphalt, commencing at 367 degrees for no rubber, 0 percent, and increasing approximately 60 degrees for each percent of the rubber introduced, using the latex containing about 26.8% solid. It is to be noted that with the selected limits and materials used in the illustrated test, the asphalt has to be heated to the cracking temperature to be sufficiently hot to permit interblending and dispersion of 4 percent rubber, and if a greater percentage of rubber is used, the conditions must be changed by operating with a lower final temperature, using the latex with less water content or using an asphalt temperature exceeding the indicated cracking temperature.

It was discovered that a better product was obtained where the initial asphalt temperatures were as high as possible. The results of tests are indicated in the following table which shows the viscosities of dispersions of a latex similar to Fomex blended in 85–100 penetration aphalt using initial asphalt temperatures of 300–325 degrees and 450–475 degrees respectively:

| Sample | Viscosity | |
|---|---|---|
| | 300–325 degrees | 450–75 degrees |
| A (1% rubber) | 175 | 160 |
| B (2% rubber) | 320 | 225 |
| C (3% rubber) | 188 | 163 |

This substantial reduction in viscosity at the greater processing temperature would suggest that if a 1 or 2 percent rubberized asphalt were to be made in accordance with the limitations set forth in Fig. 3, that additional water should be used in the latex to control the temperature reduction and permit a higher initial or processing temperature of the asphalt.

The entire operation may be carried out under moderate pressures, with the pressures flowing the asphalt and latex into the blending pipe 12, being only sufficient to overcome the frictional resistance and hydraulic head of the mass as it continues to flow upwardly through the tower with the turbulent blending action caused by the steam. In preferred construction, the blending pipe is set vertical and with movement of the steam and blended rubberized asphalt being upwardly; however, it is within the contemplation of the invention to provide for a blending pipe which may be inclined or even horizontal. It appears that the critical factors of the invention are to provide a blending pipe which permits the flow of the rubberized asphalt and steam therethrough with sufficient lateral confinement of the pipe walls to prevent excessive recirculation of the reduced-temperature-rubberized asphalt into the high temperature uncombined asphalt. Also a physical restriction must exist which permits the agitation of steam within the body of the asphalt and not a direct, immediate escape of steam at a free surface where splattering and other uncontrollable conditions would occur. Such physical restriction may exist by virtue of the length of the blending pipe or by virtue of the depth at which the latex is introduced into the body of the asphalt.

It is to be noted that the introduction of the latex is as a stream and need not be under pressure at the exit 18, although it is desirable that this flow and the flow of asphalt be substantially steady and uniform to obtain a selected uniform blend. It is obvious that others skilled in the art can devise, develop and operate alternative and equivalent processes which are within the spirit and scope of our invention, hence it is our desire that our protection be limited, not by the details described herein, but only by the proper scope of the appended claims.

I claim:

1. In the process of manufacturing rubberized asphalt in which an aqueous rubber latex is introduced into a confined body of molten asphalt moving through an enclosed zone, the latex being introduced at a point within the molten body where the heat content of the asphalt is sufficiently great to evaporate the water content of the latex, the flow of the resultant mixture is continued as a confined body for a time period sufficient to obtain uniform dispersion of the rubber in the asphalt and the vaporization of the water from the latex to form steam and the mixture is then discharged from the enclosed zone for release of the steam, and in which process an objectionable amount of foam and froth normally results upon discharge of the mixture from said enclosed zone, the improvement whereby substantially foam-free dispersions having superior properties are produced which comprises the steps of heating the asphalt, prior to mixing the latex therewith, to a temperature such that its heat content is materially in excess of that required to convert the latex-water into steam, said temperature being such, with relation to the proportion, temperature and water-content of the latex, that the temperature of the resultant mixture exceeds the foam-forming temperature range of the particular mixture but is below that at which the rubber constituent thereof is depolymerized, and thereby effecting release of the steam from the hot mixture upon discharge from the confining zone without substantial foaming.

2. The process of claim 1 in which the latex is introduced at normal temperature into the asphalt.

3. The process of claim 1 in which the asphalt, prior to mixing the latex therewith, is heated to the maximum temperature permissible without depolymerizing the rubber constituent of the resultant mixture.

4. In the process of manufacturing rubberized asphalt in which an aqueous rubber latex is introduced into a confined body of molten asphalt moving through an enclosed zone, the latex being introduced at a point within the molten body where the heat content of the asphalt is sufficiently great to evaporate the water content of the latex, the flow of the resultant mixture is continued as a confined body for a time period sufficient to obtain uniform dispersion of the rubber in the asphalt and the vaporization of the water from the latex to form steam and the mixture is then discharged from the enclosed zone for release of the steam, and in which process an objectionable amount of foam and froth normally results upon discharge of the mixture from said enclosed zone, the improvement whereby substantially foam-free dispersions having superior properties are produced which comprises the steps of heating the asphalt, prior to mixing the latex therewith, to a temperature such that its heat content is materially in excess of that required to convert the latex-water into steam, the temperature of the resultant asphalt-rubber mixture, after vaporization of the water of the latex, exceeding about 325° F. and being such, with relation to the proportion, temperature and water-content of the latex, that the temperature of the resultant mixture exceeds the foam-forming temperature range of the particular mixture but is below that at which the rubber constituent thereof is depolymerized, and thereby effecting release of the steam from the hot mixture upon discharge from the confining zone without substantial foaming.

5. The process of claim 4 in which the temperature of the resultant mixture is less than about 400° F.

6. The process of claim 5 in which the temperature of the resultant mixture is about 367° F.

7. The process for manufacturing substantially foam-free rubberized asphalt by interblending an aqueous rubber latex and molten asphalt comprising introducing the latex into a body of a confined flowing stream of asphalt preheated to such a temperature and so correlated with the proportion, temperature and water content of the latex that the temperature of the resultant mixture, after the water of the latex is flashed off, is in excess of about 325° F., the latex being introduced into the preheated molten asphalt at a point where the heat content of the molten asphalt is materially in excess of that required to convert the latex-water into steam, the introduction of the latex into the molten asphalt resulting in the flashing of the latex-water into steam, flowing the resultant mixture as a confined stream for a period sufficient to obtain uniform dispersion of the rubber of the latex throughout the asphalt, and discharging the mixture from the enclosed zone for release of the steam, whereby a substantially foam-free rubberized asphalt is obtained.

References Cited in the file of this patent
UNITED STATES PATENTS

| | | |
|---|---|---|
| 2,433,849 | Lathrop et al. | Jan. 6, 1948 |
| 2,537,190 | Lankau et al. | Jan. 9, 1951 |
| 2,686,166 | Taylor | Aug. 10, 1954 |

UNITED STATES PATENT OFFICE

CERTIFICATE OF CORRECTION

Patent No. 2,921,313                             January 12, 1960

Francis B. Odasz, Jr.

It is hereby certified that error appears in the above numbered patent requiring correction and that the said Letters Patent should read as corrected below.

In the grant, line 12, for "Jewell R. Benson, her heirs" read -- Jewell R. Benson, his heirs --; in the printed specification, column 2, line 62, for "concepts" read -- concept --.

Signed and sealed this 14th day of June 1960.

(SEAL)
Attest:

KARL H. AXLINE
Attesting Officer

ROBERT C. WATSON
Commissioner of Patents